United States Patent

[11] 3,561,703

| [72] | Inventor | Fred B. Stencel<br>Asheville, N.C. |
|---|---|---|
| [21] | Appl. No. | 839,195 |
| [22] | Filed | July 7, 1969 |
| [45] | Patented | Feb. 9, 1971 |
| [73] | Assignee | Stencel Aero Engineering Corporation<br>Arden, N.C.<br>a corporation of North Carolina |

[54] CANOPY BREAKING BY SHAPED CHARGE
9 Claims, 8 Drawing Figs.

[52] U.S. Cl. ................................................... 244/122
102/24; 244/121
[51] Int. Cl. .............................................. B64d 25/10
[50] Field of Search ........................................ 244/122,
122.17, 122.15, 122.11, 122.13, 122.12, 121;
102/24

[56] References Cited
UNITED STATES PATENTS

| 2,543,057 | 2/1951 | Porter ........................... | 102/24 |
| 2,587,243 | 2/1952 | Sweetman ..................... | 102/24 |
| 2,605,704 | 8/1952 | Dumas .......................... | 102/24 |
| 2,693,326 | 11/1954 | Lobelle ......................... | 244/122 |
| 3,152,781 | 10/1964 | Martin ........................... | 244/122 |
| 3,248,072 | 4/1966 | Schimmel ..................... | 244/122 |

*Primary Examiner*—Milton Buchler
*Assistant Examiner*—C. A. Rutledge
*Attorney*—Roylance, Abrams, Kruger, Berdo & Kaul ABSTRACT: A device for breaking the canopy overlying an aircraft ejection seat prior to the time that the seat contacts the canopy. An explosive shaped charge is provided for directly blasting an opening in the canopy and detonating means are provided for exploding the charge. Movable means, advantageously in the form of canopy breaker means are provided for movement toward the underside of the canopy as a seat ejection operation is initiated and the detonating means explodes the charge at substantially the same time as the canopy breaker means contacts the underside of the canopy. As the charge blasts an opening in the canopy, the breaker means continues moving through the canopy to enlarge the opening, if necessary.

INVENTOR,
FRED B. STENCEL
BY Arnold, Roylance,
Kruger and Durkee
ATTORNEYS

INVENTOR,
FRED B. STENCEL
BY Arnold, Roylance,
Kruger and Durkee
ATTORNEYS

CANOPY BREAKING BY SHAPED CHARGE

This invention relates to aircraft escape systems, such as ejection seats, and more particularly it relates to an improvement for breaking the frangible aircraft canopy which normally overlies the cockpit and any ejection seat installed therein.

As is explained in copending application Ser. No. 708,702, filed Feb. 27, 1968, in the name of James W. Duncan and Fred B. Stencel, it has become conventional to provide ejection seats in many types of aircraft, particularly military aircraft. Since such ejection seats are propelled upwardly out of the aircraft upon initiation of an ejection operation, some means must be provided for removing the aircraft canopy prior to ejection. If the canopy were not removed, and the seat itself were used as a means for breaking the canopy, there would be a severe deceleration to the seat and the occupant, and the forces transmitted to the occupant could provide very serious, if not fatal, spine, neck and head injuries. The known proposals for removing a canopy prior to seat ejection have not proved altogether satisfactory. For example, one type of proposal involves raising the canopy a small amount to permit air pressure to pull the same away, but this proposal is not altogether satisfactory because of the uncertainties in timing and the potential delays involved, particularly if ejection has to occur at extremely low altitudes. Another proposal involved utilizing separate explosive devices for actually blasting the canopy away from the airframe, but this necessarily involved separate explosive charges for the canopy, mechanism for energizing the same, and hence increased cost, weight, system complexity, and maintenance requirements.

Therefore, the system described in aforementioned application Ser. No. 708,702 included a system where canopy breakers were incorporated into the catapults for the seat itself. In this manner, when an ejection operation was initiated, the canopy gases would propel the breakers upwardly to contact and shatter the canopy, prior to the time that the uppermost portion of the seat came in contact with the canopy. This arrangement as described in such aforementioned application does constitute a considerable advance over the known prior art and is considered to be a highly desirable and effective way of producing the desired canopy breaking. However, in the case of rather thick canopies, it was found that a considerable amount of force had to be generated in order to drive the breakers upwardly with enough power to create the desired canopy breading breaking. With this in mind, it is, therefore, a primary object of the present invention to provide an arrangement where the canopy breaking is aided or boosted through the use of an auxiliary device, such as an explosive shaped charge.

Another object of the present invention is to provide a unique and simple auxiliary device, capable of use in conjunction with catapult-actuated canopy breakers, such as those described in aforementioned application Ser. No. 708,702, without involving any appreciable redesign of the breakers or their actuating means.

Another object of the present invention is to provide an arrangement wherein an explosive charge is used to initiate breaking of an aircraft canopy, so that the subsequent physical breaking forces, as provided by canopy breaker members, can be reduced.

Another object of the present invention is to provide an arrangement for quickly and positively breaking thick acrylic or the like aircraft canopies prior to contact by an ejection seat.

Other objects, advantages and salient features of the present invention will become apparent from the following detailed description, which, taken in conjunction with the annexed drawings, discloses preferred embodiments of the present invention.

Referring to the drawings, which form a part of this original disclosure:

Figure 1:
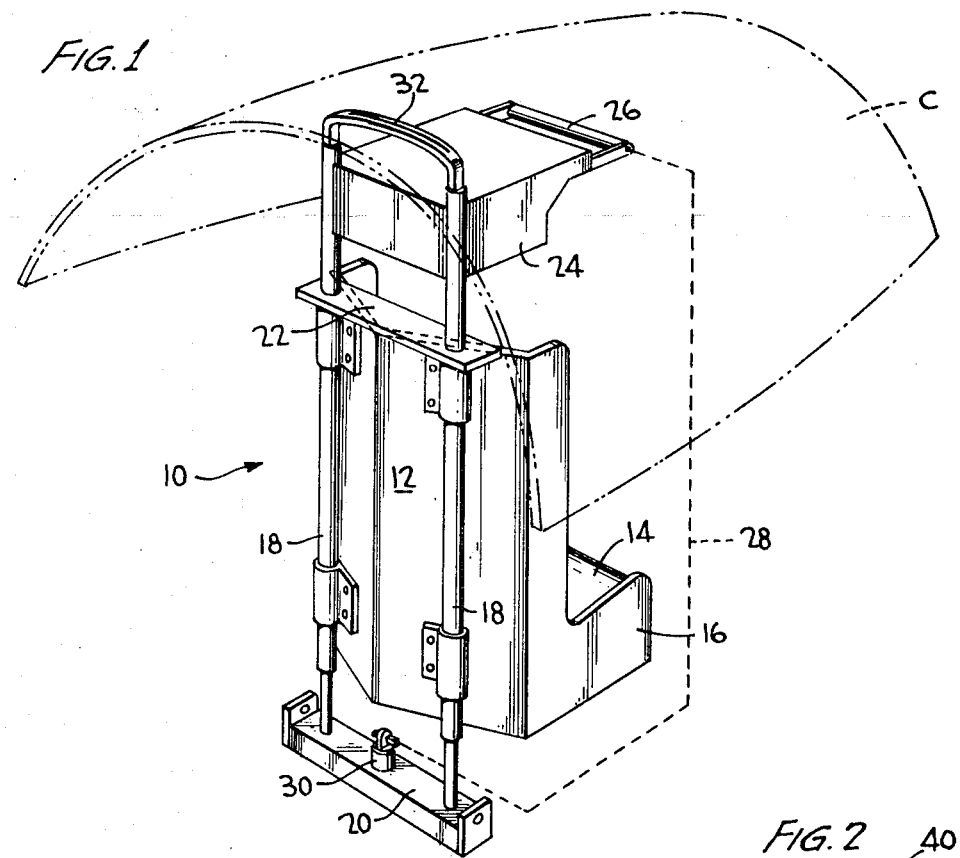
FIG. 1 is a perspective view of a typical aircraft ejection seat having canopy breakers in accordance with the present invention installed therein.
Figure 4:
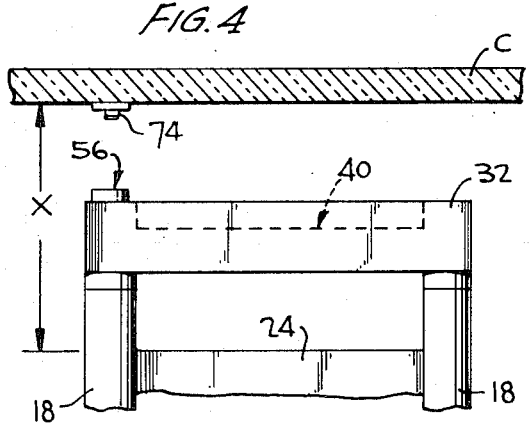
Figure 5:
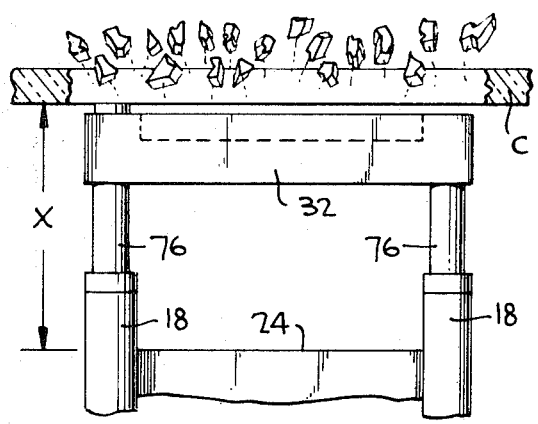
Figure 6:
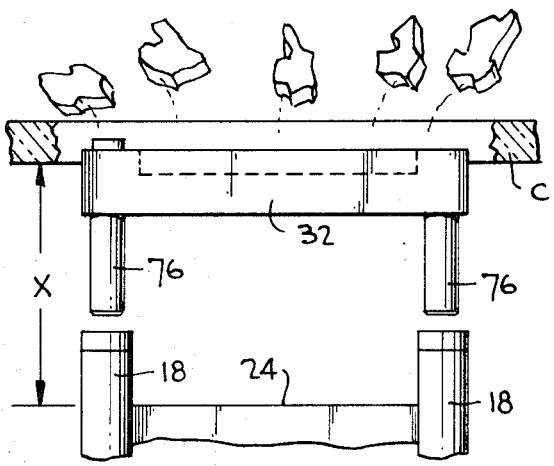
Figure 7:
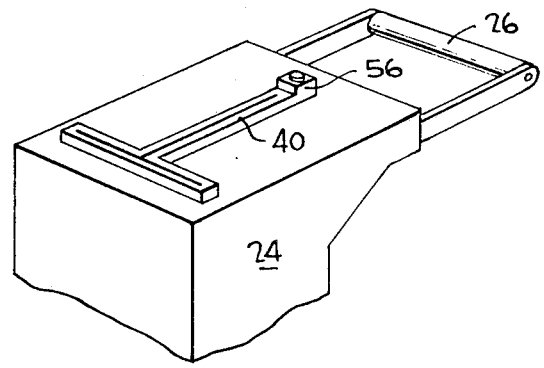
Figure 8:
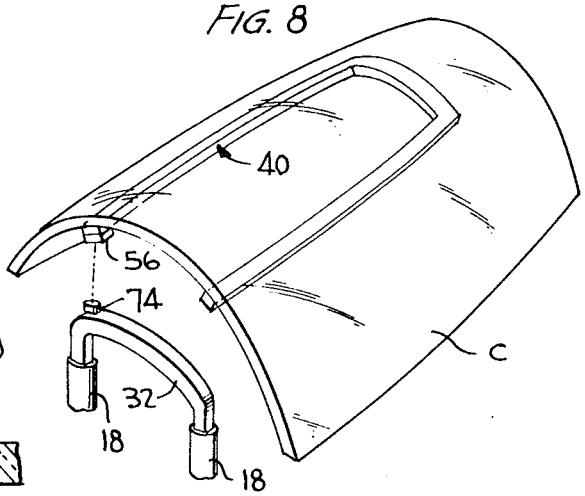

FIGS. 4—6, inclusive, are sequential operating views of the device of the present invention;

FIG. 7 is a fragmentary perspective view showing a modification of the present invention; and FIG. 8 is a fragmentary perspective view showing a further modification of the present invention. Referring now to FIG. 1, there is shown an ejection seat generally designated 10, of the type which is normally mounted in an aircraft cockpit, and an overlying arched canopy generally designated C which extends across the open cockpit and which is mounted to the airframe of the aircraft. The canopy itself is ordinarily formed of stretched acrylic plastic, or other similar material, and is of adequate transparency to enable the occupant of the seat 10 to make visual observations therethrough.

The ejection seat 10 and the components associated therewith is of the type shown in aforementioned application Ser. No. 708,702 and also of the type shown and described in U. S. Pat. application Ser. No. 720,650 filed Apr. 11, 1968, in the name of James W. Duncan and Fred B. Stencel. As such, the seat 10 includes a seat back 12, a seat pan 14 and a pair of forwardly extending seat sides 16. A pair of catapult assemblies 18, 18 extend along the seat back 12 and are attached thereto, and the lower ends of these catapults connect with a transverse header or manifold 20 which is mounted to the airframe itself. The upper ends of the catapult assemblies 18 project above a bridge member 22 located at the level of the top of the seat back 12. A headrest 24 is connected to the upper end of these catapult assemblies 18 and is provided with a forwardly projecting handle 26 which in turn is connected with a face curtain.

The dotted line 28 in FIG. 1 indicates that the face curtain handle 26 is operatively connected with an explosive charge or cartridge 30 which is centrally mounted on the header 20. Thus, in the manner explained in both of the aforementioned applications, when the occupant of the seat 10 desires to initiate an ejection operation, he grasps the handle 26 and pulls the same forwardly and downwardly. Face curtain type initiators of this type are well known in the prior art, as shown for instance in U.S. Pat. No. 2,467,763. Operation of the handle 26 and the connected face curtain energizes the cartridge 30 thus causing the same to explode and thereby transmit high pressure gases through the header 20 and through the catapult assemblies 18. As described in detail in aforementioned application 708,702, a pair of canopy breaker members are mounted in the top of the catapult assemblies 18 and a beam 32 can be connected between these members, as shown in FIG. 1. The high pressure gases in the catapult assemblies 18 thus serve to propel the beam 32 and its connected canopy breakers upwardly, prior to any movement of the seat 10. As the beam 32 strikes the underside of the canopy C, it breaks or shatters the same, thereby weakening the entire canopy by setting up an area of high stress concentration. Continued expansion of gases in the catapult tubes 18 will propel the seat upwardly, and if the canopy is not completely shattered by prior contact of the canopy breaker beam 32, then the top of the headrest will readily further shatter the canopy and enlarge the ejection opening. Because of the prior breaking and weakening of the canopy, however, any contact of the seat against any unbroken portion of the canopy will not create the type of undesirable acceleration reversals which were encountered in in the prior art.

The subject matter thus far described herein does not form any part of the present invention, but instead, is a mere summary of the descriptive matter appearing in the aforementioned application Ser. No. 708,702, and to a lesser degree, in aforementioned application Ser. No. 720,650. To the extent necessary for a complete operation of the ejection system and canopy breading, the pertinent portions of those aforesaid applications are incorporated herein by reference. However, as discussed in the introduction hereto, the present invention is not concerned merely with the broad concept of catapult-actuated canopy breakers and their manner of operation, but instead, is concerned with an arrangement for boosting the operation and increasing the efficiency of such breading in order to break or shatter thick canopies. This boosting of the breaking operation is accomplished, in its broadest sense, through utilization utilization of an explosive shaped charge. The method of utilizing a "shaped" explosive charge, also known as a "hollow" charge or "cavity effect" charge has been known and used for a great many years. This method is also known as the Munroe effect, and the principle thereof involves concentrating forces from an explosive charge by means of a shaped concave opening directed toward an area to be penetrated by the blast. Shaped charges in general, the method of their construction and the manner of their operation are disclosed in U.S. letters Pat. Nos. 2,595,960; 2,605,704; 3,027,838 3,188,955. Additionally, it has been known to use elongated shaped or hollow charges which are commonly referred to as linear shaped charges and devices of this type are disclosed in U.S. letters Pat. Nos. 2,543,057; 2,513,233; 2,587,243 and 3,165,057. The underlying principle of the present invention is to provide and utilize a linear-shaped charge in cooperative conjunction with the canopy breaker means so that the shaped charge explodes at substantially the same time as the canopy breaker means contacts the underside of the canopy, thereby permitting the charge to blast an opening in the canopy explosively.

Figure 2:
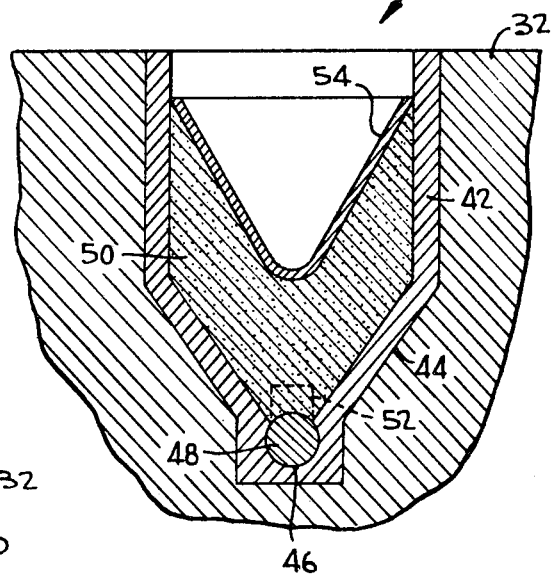
FIG. 2 is an enlarged fragmentary sectional view through a canopy breaker device, showing the explosive shaped charge therein

With reference to FIG. 2, which is a transverse cross-sectional view through the canopy breaking beam 32, there is shown mounted within the beam 32 a linear-shaped charge which is generally designated 40. This linear-shaped charge includes a housing or casing 42 generally formed of soft metal and configured with inwardly sloping bottom walls 44 which terminate in a generally cylindrical opening 46. Within the opening 46, and elongated fuse 48 is provided, and this fuse is formed of a suitable explosive material, as, for example, the well-known Primacord fuse material. The casing or housing 42 is filled with a charge of explosive material such as TNT or RDX, or other suitable materials. If desired, a small booster charge 52 of explosive material can be provided immediately adjacent the fuse 48. Finally, the casing contains a metallic liner 54 which is commonly in the shape of a truncated cone, but which can also be formed of a parabolic or other arched configuration. The shape of the charge 50 ad the configuration of the liner 54 serve to assure that the blast generated by the shaped charge unit 40 will be highly directed and concentrated to thereby cause immediate penetration of the canopy C.

In order to set off the shaped charge unit 40, some suitable form of detonating means must be provided for igniting the fuse 48, and while this detonating means can be of various suitable forms, it is desired that the same be set off or initiated at substantially the same time as the canopy breaker contacts the underside of the canopy C.

Figure 3:
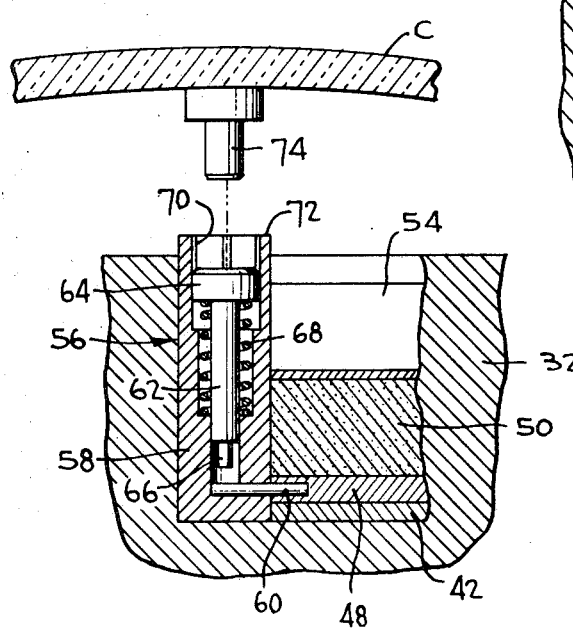
FIG. 3 is a fragmentary sectional view showing the detonating means for the explosive shaped charge.

One suitable form of detonating device is shown in FIG. 3 and is generally designated 56. Such detonating means includes a housing 58 installed in the beam 32 adjacent the end of the shaped charge, a blasting cap 60 connected with the fuse 48, a firing pin 62 having an enlarged head portion 64 and a striker tip portion 66 and a biasing compression spring 68 normally urging the pin 62 upwardly until the head 64 abuts against motion limiting ribs 70. It will be seen that the top edge 72 extends slightly above the top of the breaker rib 32 in order to prevent the firing pin 62 from being set off inadvertently.

In order to actuate the firing pin 62, a projection 74 is aligned therewith and is fastened to the underside of the canopy C. The shank of this projection member 74 is designed to contact the head 64 of the firing pin, when the beam 32 moves upwardly a sufficient distance to almost contact the underside of the canopy. As the beam continues its upward movement, the projection 74 will push the firing pin downwardly, thus causing the striker tip 66 to ignite the blasting cap 60, which in turn detonates the fuse 48 and the explosive hollow charge 50. This detonation, in turn, causes a directed and concentrated blast to be applied against the underside of the canopy. To more fully understand this arrangement, attention is directed to the embodiment of FIGS. 4—6 wherein the parts are shown in a somewhat simplified schematic form. That is, although the canopy C and the breaker beam 32 are generally of a curved or arched configuration, as shown in FIG. 1, they are shown flat in FIGS. 4—6 for ease of illustration. The hollow charge 40 is, as aforementioned, mounted within the beam 32 and the detonating means 56 is likewise mounted therein, in a position to ignite the hollow charge. The projection element 74, which forms a part of the detonating means, is aligned therewith and attached to the underside of the canopy C. The distance designated X is the distance from the top edge of the headrest 24 to the underside of the canopy, and it will be seen that this distance remains constant until the canopy is broken. Thus, in FIG. 4, the parts are shown in their normal position, prior to initiation of any ejection operation. In FIG. 5, the ejection operation has been commenced and the catapult assemblies 18 have been fired. The high pressure gases therein drive the canopy breaker elements 76 upwardly and hence drive their interconnecting beam 32 upwardly. At substantially the time when the beam 32 contacts the underside of the canopy C, the detonating means 56 sets off the hollow charge, thereby causing the same to blast a slot or opening into the canopy C in the manner shown in FIG. 5. It will be seen that at this point the seat has not yet started to move upwardly and the distance X still remains the same. In FIG. 6, which is just prior to commencement of upward movement of the seat, the canopy breaker elements 76 are driven fully out of the catapult tubes 18, and the breaker beam 32 is thus driven through the canopy C itself, Since the shaped charge has already blasted a slot or opening into the canopy C and has substantially weakened the same and set up an area of stress concentration, the breaker beam 32 will easily break through the canopy without the need for too much force. In the event that the blast from the shaped charge 40 has not fully shattered the canopy, then the breaker beam will further shatter the same and will further enlarge the opening so that when the ejection seat is propelled upwardly, it will not receive any undue acceleration reversals due to contact with an unbroken or substantially unbroken canopy.

In the embodiment of FIG. 8, the positions of the parts are reversed and the shaped charge 40 is mounted on the underside of the canopy while the projection element 74 is mounted on the breaker beam 32. The operational results will, of course, be the same same since at substantially the same time that the beam 32 reaches the underside of the canopy, the shaped charge will be set off.

Finally, in FIG. 7, there is shown a somewhat different embodiment, which is not preferred, but which nevertheless is possible. In this embodiment, the shaped charge 40 is provided in a generally T-shaped arrangement of top of the headrest 24 rather than on the canopy breakers, which may be eliminated. Then, as the headrest 24 and the rest of the seat move upwardly, the shaped charge will be set off to blast an opening in the canopy. It is believed that this arrangement will not provide any unusual downward acceleration forces on the seat occupant as the canopy has been sufficiently weakened by the explosively cut groove in the canopy. Nevertheless, while this FIG. 7 arrangement is a possible embodiment, it is not preferred in the same sense as the previously described embodiments.

It should be noted from the foregoing detailed description that although one type of detonating means and one type of shaped charge have been described in detail, such description is only for purposes of showing a suitable operative embodiment and the invention is not intended to be limited either to the precise form of shaped charge or the precise form of detonating means described. Rather, it is felt that any form of linear-shaped charge can be utilized, and any suitable detonating means 56 which ignites the shaped charge 40 at substantially the same time as the breaker elements reach the underside of the canopy can be used.

After reading the foregoing detailed description, it will be apparent that the objects set forth at the outset of the specification have been successfully achieved by the present invention.

I claim:

1. In the combination of an aircraft having a cockpit covered by a frangible canopy and an ejection seat installed in said cockpit and being selectively ejectable therefrom, the improvement for breaking said canopy to facilitate ejection which comprises:

movable means mounted within said cockpit and being movable toward the underside of said canopy as an ejection operation of said seat is initiated;

an explosive shaped charge for directly blasting an opening in said canopy; and detonating means for exploding said shaped charge at substantially the same time as said movable means contacts said underside of said canopy.

2. The improvement defined in claim 1 wherein said movable means comprises canopy breaker means.

3. The improvement defined in claim 2 wherein said detonating means includes a first portion mounted on said canopy breaker means and a second cooperating portion mounted on the underside of said canopy.

4. The improvement defined in claim 2 wherein said explosive shaped charge is mounted on said canopy breaker means.

5. The improvement defined in claim 2 wherein said explosive shaped charge is mounted on the underside of said canopy.

6. The improvement defined in claim 2 wherein said canopy breaker means is moved through said canopy after said explosive charge blasts said opening therein, such movement of said canopy breaker means serving to enlarge said opening and further fracture said canopy if said blast failed to form a large enough opening.

7. The improvement defined in claim 1 wherein said movable means comprises a headrest forming a part of said ejection seat.

8. The improvement defined in claim 7 wherein said explosive shaped charge is mounted on top of said headrest.

9. The improvement defined in claim 7 wherein said explosive shaped charge is mounted on the underside of said canopy.